United States Patent [19]

Svedin et al.

[11] Patent Number: 4,986,973

[45] Date of Patent: Jan. 22, 1991

[54] PROCESS FOR THE PRODUCTION OF CHLORINE DIOXIDE

[75] Inventors: Björn H. Svedin; Birgitta Sundblad, both of Sundsvall; Jörgen Engström, Timra, all of Sweden

[73] Assignee: Eka Nobel AB, Surte, Sweden

[21] Appl. No.: 426,714

[22] Filed: Oct. 26, 1989

[30] Foreign Application Priority Data

Apr. 18, 1989 [SE] Sweden ................................. 8901392

[51] Int. Cl.$^5$ ............................................. C01B 11/02
[52] U.S. Cl. ......................................................... 423/479
[58] Field of Search .......................................... 423/479

[56] References Cited

U.S. PATENT DOCUMENTS

| | | | |
|---|---|---|---|
| 2,936,219 | 5/1960 | Rapson | 423/478 |
| 3,563,702 | 2/1971 | Partridge et al. | 423/478 |
| 3,864,456 | 2/1975 | Winfield et al. | 423/478 |
| 4,081,520 | 3/1978 | Swindells et al. | 423/478 |
| 4,115,217 | 9/1978 | Larsson et al. | 423/479 |
| 4,770,868 | 9/1988 | Norell | 423/479 |

FOREIGN PATENT DOCUMENTS 517755 1/1931 Fed. Rep. of Germany .
329386 12/1970 Sweden .

*Primary Examiner*—Jeffrey E. Russel
*Assistant Examiner*—Brian M. Bolam
*Attorney, Agent, or Firm*—Burns, Doane, Swecker & Mathis

[57] ABSTRACT

A process for producing chlorine dioxide by reacting in a reaction vessel an alkali metal chlorate, mineral acid and a reducing agent in such proportions that chlorine dioxide is produced in a reaction medium maintained at a temperature of from about 50° C. to about 100° C. and at an acidity within a range of from about 2 to about 11 N. The reaction medium is subjected to subatmospheric pressure sufficient for evaporating water, a mixture of chlorine dioxide and water vapor being withdrawn from an evaporation zone in the reaction vessel and alkali metal sulfate being precipitated in a crystallization zone in the reaction vessel. A mixture of formaldehyde and methanol is used as reducing agent.

6 Claims, No Drawings

PROCESS FOR THE PRODUCTION OF CHLORINE DIOXIDE

The present invention relates to a process for the production of chlorine dioxide from an alkali metal chlorate, a mineral acid and formaldehyde or a mixture of formaldehyde and methanol as a reducing agent. The process is carried out in a vessel operated under subatmospheric pressure, water being evaporated and withdrawn together with chlorine dioxide, and the alkali metal salt of the mineral acid being crystallized in the reaction vessel and withdrawn therefrom.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

It is known to produce chlorine dioxide by the reduction of alkali metal chlorate in a water-based acidic reaction medium. Different reducing agents are used. U.S. Pat. Nos. 3,563,702 and 3,864,456 for example, describe the preparation of chlorine dioxide with chloride as reducing agent. The basic chemical reaction involved in such processes can be summarized by the formula

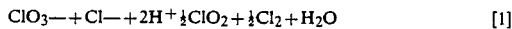

$$ClO_3^- + Cl^- + 2H^+ \tfrac{1}{2}ClO_2 + \tfrac{1}{2}Cl_2 + H_2O \qquad [1]$$

The chlorate ions are provided by alkali metal chlorate, preferably sodium chlorate, the chloride ions by alkali metal chloride, preferably sodium chloride, or by hydrogen chloride, and the hydrogen ions are provided by mineral acids, generally sulfuric acid and/or hydrochloric acid. The reactants are continuously added, and the reaction is performed in a single reaction vessel, generator-evaporator - crystallizer, at a temperature of from about 50 to about 100° C. and with an acidity of from about 2 to about 12 N.

In the production of ClO2 using chloride ions as reducing agent according to formula [1], chlorine gas is formed as a by-product. This chlorine gas by-product has previously been used as such in paper mills as bleaching agent in aqueous solution. Today, there is a tendency in industry towards a more extensive chlorine dioxide bleaching for environmental reasons and, thus, there is less need for chlorine as a bleaching agent.

It is also known to use reducing agents which do not produce chlorine. In U.S. Pat. No. 4,770,868, methanol is used as a reducing agent. The reaction ideally proceeds according to the formula

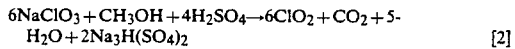

$$6NaClO_3 + CH_3OH + 4H_2SO_4 \rightarrow 6ClO_2 + CO_2 + 5H_2O + 2Na_3H(SO_4)_2 \qquad [2]$$

The direct reaction between chlorate ions and methanol is however very slow, and the correct true reducing agent in this case is chloride ions reacting according to [1]. The chlorine produced is then reacting with methanol to regenerate chloride ions according to the formula

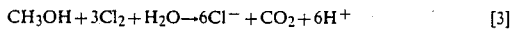

$$CH_3OH + 3Cl_2 + H_2O \rightarrow 6Cl^- + CO_2 + 6H^+ \qquad [3]$$

It is therefore often necessary to continuously add a small amount of chloride ions in order to obtain a steady production.

Chlorine dioxide production can be performed within a wide acidity range, 2-11 N being a common range.

From a corrosive point of view, it is advantageous to work at a low acidity since corrosion increases with increasing acidity. Another advantage of performing the reaction at a low acidity is that the precipitated alkali metal sulfate is neutral, no acid is co-precipitated as at a higher acidity. Therefore, no extra neutralisation step is required for the salt precipitated. "Low acidity" here means a range between about 2 and about 4.8 N. However, a disadvantage of chlorine dioxide production within this range is that the reaction proceeds very slowly. It is known that the reaction speed can be increased when using chloride as reducing agent by the use of a small amount of catalyst. Proposed catalysts are, inter alia, vanadium pentoxide, silver ions, manganese ions, dichromate ions and arsenic ions.

The processes using methanol as reducing agent are generally operated at an acidity above 4.8 in order to obtain an acceptable reaction speed. U.S. Pat. No. 4,081,520, for example, states that an acidity above 9 N is required for having an efficient reaction with methanol as reducing agent.

U.S. patent application Ser. No. 309 232 discloses a process for producing chlorine dioxide using methanol as reducing agent at a low acidity. In this process, a high reaction speed and a high yield are achieved by using the methanol together with catalysts.

U.S. Pat. No. 4,081,520 also mentions formaldehyde and formic acid as conceivable reducing agents in the process, but does not give a more specified description thereof. U.S. Pat. No. 4,770,868 also mentions formaldehyde as one reducing agent among a number of such agents stated in the U.S. publication.

In experiments it was found that when formaldehyde was used as reducing agent, the production rate increased for chlorine dioxide by 50% as compared with methanol. One drawback however is that the yield in respect of chlorate drops to an unacceptable level, i.e. the production of chlorine as a by-product becomes high.

The present invention as recited in the claims offers an improved process for the production of chlorine dioxide. In the process according to the invention, a mixture of formaldehyde and methanol is used as reducing agent. It has surprisingly been found that the reaction speed can be considerably increased in the production of chlorine dioxide when using a mixture of formaldehyde and methanol as reducing agent. It was surprisingly found that when formaldehyde is used in combination with methanol a high yield is obtained at equally high or even higher production rate than for formaldehyde alone. The process gives a satisfactory result within the entire acidity range from about 2 to 11 N, but gives especially good results at low acidities. It is a preferred embodiment to use the present process at an acidity of from about 2 to 4.8 N.

Although is not necessary to use catalysts in the present process, the effect can be increased slightly further if a catalyst of e.g. palladium and manganese, or mixtures thereof, is used. Examples of usable catalysts are those stated in U.S. patent application Ser. No. 309 232. The catalysts are used in the form of soluble salts or complexes, such as for example chlorides and sulfates. They are added in such an amount that the concentration in the reactor solution becomes from 0.001 to 10 mM, preferably from 0.01 to 5 mM.

The amount of reducing agent suitable for use in the process according to the invention is about 0.08 to 0.25 kg of a mixture of methanol and formaldehyde per kg chlorine dioxide, preferably about 0.1 to 0.2 kg per kg chlorine dioxide. The ratio of methanol to formaldehyde in the reducing agent mixture may vary within wide limits. From 1 to 70% by weight of the mixture may be formaldehyde and from 99 to 30% by weight methanol. Suitably, from 1 to 50% by weight is formaldehyde and from 99 to 50% by weight methanol. It is preferred that from 1 to 10% by weight of the mixture is formaldehyde and from 90 to 99% by weight methanol.

According to the invention, it is provided to add formaldehyde to the reaction medium, it being understood that any formaldehyde that may be produced from the methanol present is not included in the amounts given above. Normally, the formaldehyde is added to the reactor at the same time as the methanol, but it is also possible to add methanol to the reactor separately.

The production of chlorine dioxide according to the present process is performed in a single reaction vessel, generator - evaporator - crystallizer. A suitable reactor is an SVP ® (single vessel process) reactor. The reactants are continuously supplied to the reactor. The alkali metal chlorate is added in an amount of from 1.58 to 2.0 tonnes per tonne chlorine dioxide. The reaction is suitably operated at a temperature of 50-100° C., preferably 50-75° C. and at a pressure below atmospheric pressure, suitably at 60-400 mm Hg. The reaction medium is then boiling or water is evaporated in a sufficient amount for diluting the chlorine dioxide produced to a safe concentration. The acidity in the reactor is adjusted by adding sulfuric acid or other mineral acid. In the reactor, the alkali metal salt of the mineral acid is continuously crystallized and separated in a suitable manner. The process is not restricted to any of the alkali metals, but sodium is the most preferred.

The invention will now be illustrated by the following Examples where parts and percentages relate to parts by weight and per cent by weight, unless otherwise stated. Examples 1 and 2 are comparative experiments. In example 1, formaldehyde alone is used as reducing agent and in Example 2, methanol alone is used as reducing agent.

EXAMPLE 1

A chlorine dioxide reactor was supplied with 560 g/h $NaClO_3$ in aqueous solution and 62 g/h 50% formaldehyde solution. 50% $H_2SO_4$ was added to maintain an acidity of 3.8–4.2 N. With the chlorate solution was added 7 g/h NaCl. The reactor operated continuously at a temperature of 60° C., and the reaction medium was kept boiling in that the pressure was 150 mm Hg, i.e. below atmospheric pressure. The chlorine dioxide production was 0.6 kg/l per day and the yield was 80%.

EXAMPLE 2

Although a higher yield of 96% was obtained in comparative experiments using methanol alone, the production of chlorine dioxide was only 0.4 kg/l per day.

Thus, a production rate increased by 50% was obtained when using formaldehyde alone instead of methanol alone.

The crystals formed in these two experiments consisted of neutral sodium sulfate $Na_2SO_4(S)$.

EXAMPLE 3

The reducing agent used was a mixture consisting of 90% methanol and 10% formaldehyde.

This experiment was conducted in accordance with Example 1, but the addition of chlorate was 590 g/h, and a solution containing 50% methanol and 5% formaldehyde was added at a rate of 52 g/h. 50% sulfuric acid was added so as to maintain the acidity in the reactor at 4.3–4.4 N. The temperature was 91° C. and the pressure 350 mm Hg. The production of chlorine dioxide was 0.9 kg/l per day and the yield 90%.

EXAMPLE 4

In an experiment identical with that of Example 3 were additionally added 0.135 gpl $Mn^{2+}$ and 0.14 gpl $Pd^{2+}$. The yield of chlorine dioxide momentarily increased to above 96% while at the same time the maximum production rate increased to 1.0 kg/l per day. Also in this case, neutral sodium sulfate was obtained.

EXAMPLE 5

In another experiment, the reactor was supplied with chlorate solution, sulfuric acid and reducing agent in accordance with Examples 3 and 4, but the reactor pressure was kept at 150 mm, thus making it possible to maintain the boiling point at 60° C. Also in this case, 0.135 gpl $Mn^{2+}$ and 0.14 gpl $Pd^{2+}$ were added. The yield was 96% at a production rate of 0.6 kg/l per day.

EXAMPLE 6

A further experiment was conducted in accordance with Example 1, however with the difference that the pressure was 350 mm Hg. The production of chlorine dioxide was 0.7 kg/l per day, and the yield was 81%.

EXAMPLE 7

A further Example was conducted in accordance with Example 2, but a pressure of 350 mm Hg. The production of chlorine dioxide was 0.5 kg/l per day and the yield 86%.

We claim:

1. A process for the production of chlorine dioxide by reacting in a reaction vessel an alkali metal chlorate, mineral acid and a reducing agent in such proportions that chlorine dioxide is produced in a reaction medium which is maintained at a temperature of from about 50° C. to about 100° C. and at an acidity within a range of from about 2 to about 11 N and which is subjected to subatmospheric pressure sufficient for evaporating water, a mixture of chlorine dioxide and water vapour being withdrawn from an evaporation zone in the reaction vessel, and alkali metal sulfate being precipitated in a crystallization zone in the reaction vessel, characterized in that a mixture of formaldehyde and methanol is used as reducing agent.

2. Process as claimed in claim 1, characterized in that the mixture consists of from 1 to 70% by weight of formaldehyde and from 30 to 99% by weight of methanol.

3. Process as claimed in claim 1, characterized in that the mixture consists of from 1 to 10% by weight of formaldehyde and from 90 to 99% by weight of methanol.

4. Process as claimed in claim 1, characterized in that the acidity in the reaction vessel is from about 2 to about 4.8 N.

5. Process as claimed in claim 1, characterized in that a catalyst is used together with the reducing agent.

6. Process as claimed in claim 5, characterized in that palladium and manganese or mixtures thereof are used as catalyst.

* * * * *